(12) United States Patent
Imai et al.

(10) Patent No.: US 6,254,290 B1
(45) Date of Patent: Jul. 3, 2001

(54) PRINTING SYSTEM, PRINTING CONTROL SYSTEM, AND PRINTER

(75) Inventors: Tsuneo Imai, Ebina; Kenshi Hirai, Hadano, both of (JP)

(73) Assignees: Hitachi, Ltd., Tokyo; Hitachi Information Technology Co., Ltd., Kanagawa-ken, both of (JP)

( * ) Notice: Subject to any disclaimer, the term of this patent is extended or adjusted under 35 U.S.C. 154(b) by 0 days.

(21) Appl. No.: 09/043,426

(22) PCT Filed: Sep. 20, 1995

(86) PCT No.: PCT/JP95/01880

§ 371 Date: Jan. 12, 1999

§ 102(e) Date: Jan. 12, 1999

(87) PCT Pub. No.: WO97/11422

PCT Pub. Date: Mar. 27, 1997

(51) Int. Cl.[7] .................................... B41J 11/44

(52) U.S. Cl. ................... 400/76; 400/61; 400/70

(58) Field of Search ................... 400/580, 582, 400/76, 70, 61; 271/287, 298; 270/1.02, 45; 399/381, 382

(56) References Cited

U.S. PATENT DOCUMENTS

| | | | |
|---|---|---|---|
| 5,328,169 | * | 7/1994 | Mandel ............................... 271/290 |
| 5,644,685 | * | 7/1997 | Baehr .................................. 395/111 |
| 5,718,520 | * | 2/1998 | MacKay ................................ 400/61 |
| 5,870,089 | * | 2/1999 | Fabbio et al. ....................... 345/335 |

FOREIGN PATENT DOCUMENTS

| | | |
|---|---|---|
| 3-167624 | 7/1991 | (JP) . |
| 4-65261 | 3/1992 | (JP) . |
| 6-155834 | 6/1994 | (JP) . |
| 7-123236 | 5/1995 | (JP) . |

* cited by examiner

Primary Examiner—John S. Hilten
Assistant Examiner—Charles H. Nolan, Jr.
(74) Attorney, Agent, or Firm—Mattingly, Stanger & Malur, P.C.

(57) ABSTRACT

Disclosed is a printing system comprising a primary system and a printer connected thereto. To enhance the usability of a sorting operation for printed matters, the primary system includes a sorting instructing means for transmitting, to the printer, an instruction regarding contents of printing job separation marks for indicating a separation between jobs before printing job data; and the printer includes a means for analyzing a sorting instruction supplied from the primary system, and a means for executing a sorting operation in accordance with the analyzed result.

14 Claims, 6 Drawing Sheets

PRINTING SYSTEM, PRINTING CONTROL SYSTEM, AND PRINTER

TECHNICAL FIELD

This invention relates to a printing system composed of a primary system such as a computer system and a printer connected thereto, and particularly to a printing system capable of flexibly performing a sorting operation for separating, into job units, printed matters obtained by printing job data by a printer.

BACKGROUND ART

In the case where several jobs are continuously printed by a printer of a printing system, a sorting mark called a job separation mark is printed between one job and another for making it easy to recognize a separation between the jobs.

For a continuous paper printer, according to a prior art method, the above sorting mark has been printed as follows:

First, a primary system simply creates a mark form command at a separation between jobs and sends out an end separator date as a page date indicating the termination of the previous job.

When receiving a mark form command, the printer produces a blank page, and when receiving an end separator date, it prints five end separator pages. In order to allow easy sorting in the case where continuous paper is bent or folded, a job separation mark is printed out on a perforated line between end separator pages (sorting operation).

The technology of this kind has been disclosed, for example, in Japanese Patent Laid-Open Nos. Hei 4-65261 and Hei 3-167624.

According to the above prior art method, a primary system sends out only a sorting command indicating a sorting time at a separation between jobs and the termination of the previous job, and a printer prints a predetermined number of sorting pages.

Accordingly, the above-described prior art printing system cannot satisfy an individual user's particular needs to reduce the number of end separator pages or job separation marks to three pages in order to save paper, or to increase the number of job separation marks to seven pages because the separation between jobs is hard to recognize, and therefore, the printing system is poor in usability.

DISCLOSURE OF INVENTION

An object of the present invention is to solve the above-described inconvenience, and to provide a printing system capable of varying a sorting mode for each user's need or for each printing operation (printing of single job data), thereby realizing a highly flexible sorting operation.

To achieve the above object, according to the present invention, there is provided a printing system comprising a primary system for outputting a command for printing job data to be printed, and a printer for printing the job data on the basis of the command supplied from the primary system, characterized in that the primary system includes: a sorting instructing means for outputting a sorting command for designating contents of a sorting operation which is a printing operation for indicating a separation between the job data, and the printer includes: a means for analyzing the sorting command; and a means for executing the sorting operation in accordance with the result of the analysis by the analyzing means.

According to the present invention, the sorting instructing means of the primary system instructs the contents of a sorting operation to be performed by the printer before printing of job data. As a result, assuming that the number of sorting pages is designated as the contents of the sorting operation, the number of printing pages for job separation can be altered for each printing system.

With this configuration, it becomes possible to provide a printing system capable of satisfying individual user's needs to reduce the number of job separation marks to three pages to save paper, or to increase the number of job separation marks to seven pages to make it easy to recognize a separation between jobs.

Since a sorting command is given for job data before a printing command is given for the job data (or when printing data is supplied to a printer), it is possible to alter the number of separation marks at any time. Accordingly, a sorting state can be set to match the needs of the user, to thereby improve the usability of the printing system.

BEST MODE FOR CARRYING OUT THE INVENTION

Hereinafter, preferred embodiments of the present invention will be described in detail with reference to the drawings.

Figure 1:
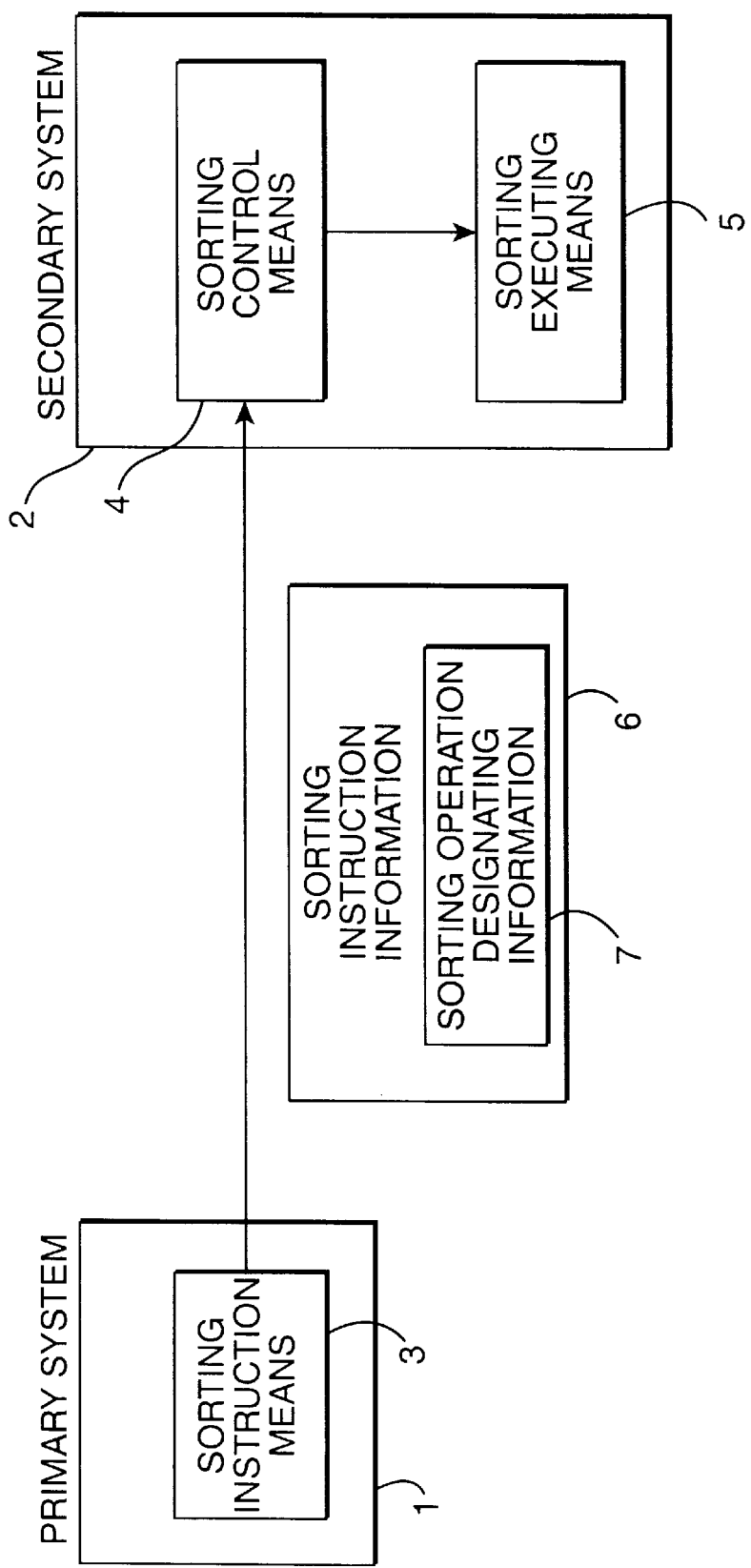
FIG. 1 s a functional block diagram of a printing system for realizing a sorting control method according to the present invention.

FIG. 1 is a functional block diagram of a printing system for realizing a sorting control method according to the present invention.

A printing system in this embodiment includes a primary system 1 such as a computer system, and a secondary system 2 such as a printer. The printer has a printer engine for executing actual printing and a controller for controlling the printer engine.

The primary system 1 has a sorting instructing means 3 for transmitting sorting instructing information 6 for allowing the secondary system 2 to perform a sorting operation upon printing.

The sorting instructing information 6 includes at least sorting operation designating information 7 for designating details of a sorting operation to be executed at the secondary system 2, for example, the printing number of sorting marks.

When the secondary system 2 receives the sorting instructing information 6 from the primary system 1, a sorting control means 4 of the secondary system 2 analyzes the sorting instructing information 6 and the sorting operation designating information 7 at least contained in the sorting instructing information 6. Then, the sorting control means 4 informs a sorting executing means 5 of the timing of starting assorting operation, the number of the sorting marks, and the like. The sorting executing means 5 carries out the sorting operation on the basis of the information supplied from the sorting control means 4. To be more specific, the sorting executing means 5 prints the designated number of the sorting marks at the designated time of the starting of the printing operation.

Figure 2:
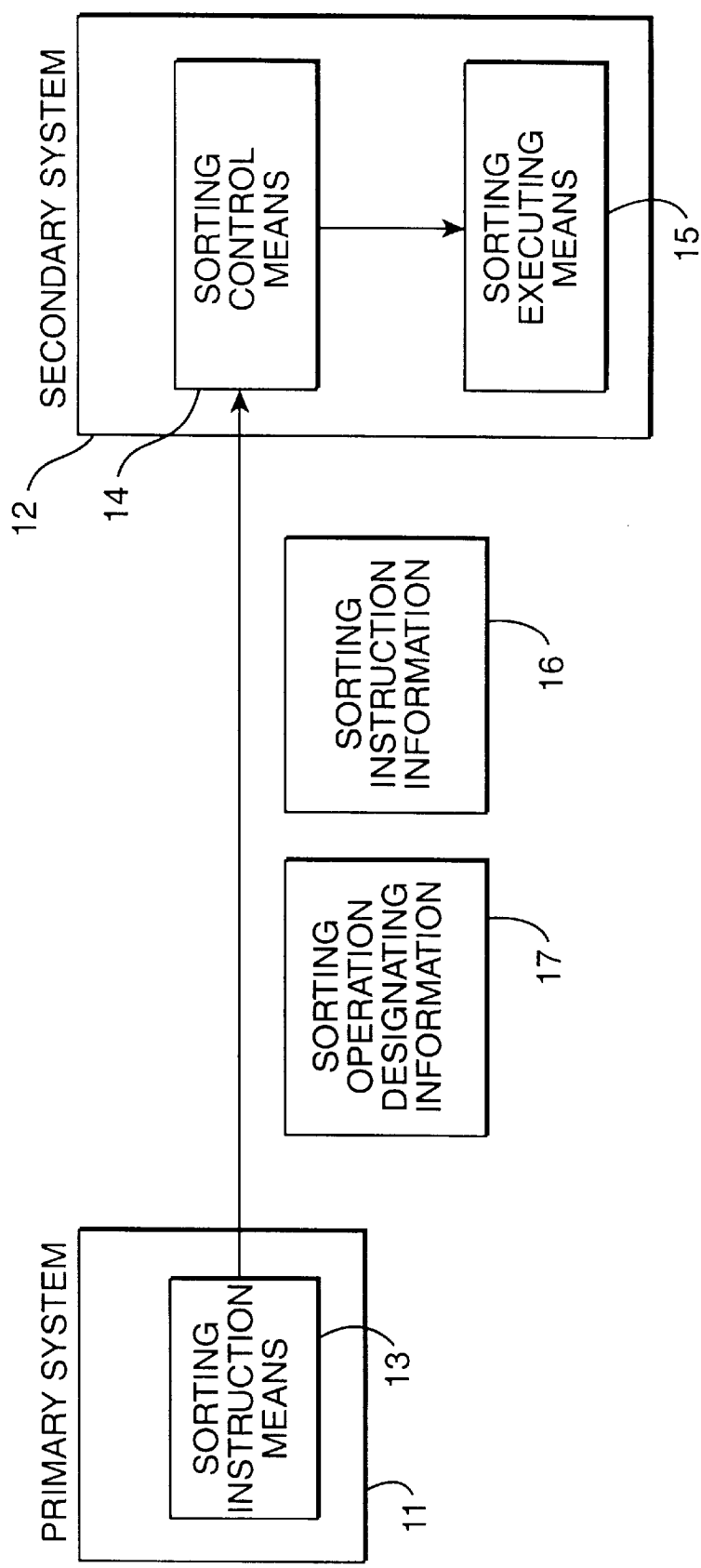
FIG. 2 is a block diagram showing another method of transmitting sorting operation designating information.

FIG. 2 is a block diagram showing another method of transmitting sorting instructing information. In the embodiment shown in FIG. 1, sorting operation designating information for designating the printing number of sorting pages is contained in sorting instructing information for instructing the timing of starting a sorting operation.

In the method shown in FIG. 2, a primary system 11 has a sorting instructing means 13. The sorting instructing means 13 is adapted to transmit sorting instructing information 16 to a secondary system 12, and to transmit, to the secondary system 12, sorting operation designating information 17 for designating the details of a sorting operation to be executed in the secondary system 12, for example, the printing number of sorting marks.

Namely, in this embodiment, a command for instructing a sorting operation and a command for designating details of a sorting operation are separately outputted.

When the secondary system 12 receives the sorting instructing information 16 from the primary system 11, a sorting control means 14 of the secondary system 12 analyzes the sorting instructing information 16 and informs a sorting executing means 15 of the timing of starting a sorting operation. Besides, when the secondary system 12 receives the sorting operation designating information 17, the sorting control means 14 analyzes the sorting operation designating information 17 and informs the sorting executing means 15 of the printing number of sorting marks and the like.

The sorting executing means 15 executes the sorting operation in accordance with the information supplied from the sorting control means 14. To be more specific, the sorting executing means 15 executes the sorting operation on the basis of the designated timing of the starting of the printing operation and prints the designated number of the sorting marks.

Figure 3:
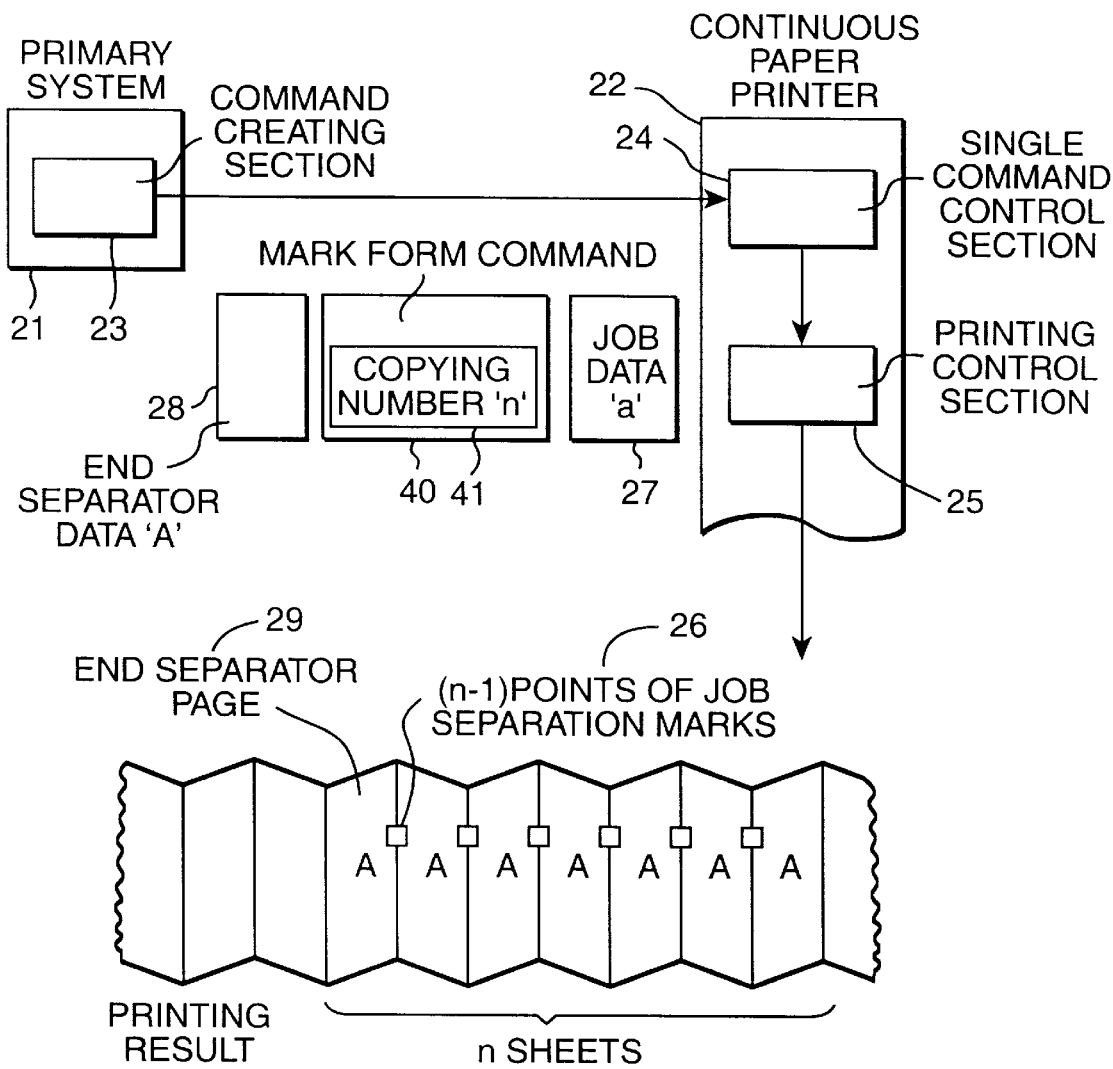
FIG. 3 is a block diagram showing the printing system for realizing the sorting control method according to the present invention using a continuous paper printer.

FIG. 3 is a block diagram showing a printing system for realizing the sorting method according to the present invention by example of a continuous paper printer. A primary system 21 has a command creating section 23, which is a means for creating printing data and a mark form command 40 and these are transmitted to a continuous paper printer 22.

The primary system 21 transmits job data 27 as a command and also transmits the mark form command 40 after termination of a job. In the mark form command, a copying number 41 for designating the number of pages on which subsequent end separator data 28 are to be copied is designated as "n." Then, the end separator data 28 are transmitted as a command. The end separator data 28 are analyzed at a single command control section 24 together with the mark form command 40.

In this embodiment, it is judged that n pages of the end separator data 28 and (n−1) points of the job separator marks 26 are to be printed.

Based on this judgment, the command control section 24 instructs a printing control section 25 to print n pages of the end separation data 28 and (n−1) points of the job separation marks 26. After printing of the job data, the printing control section 25 prints n copies of end separator page 29 and also prints (n−1) points of the job separation marks 26 on perforated lines between the end separator pages. It may be apparent that a blank page can be printed before the first end separator page.

Figure 4:
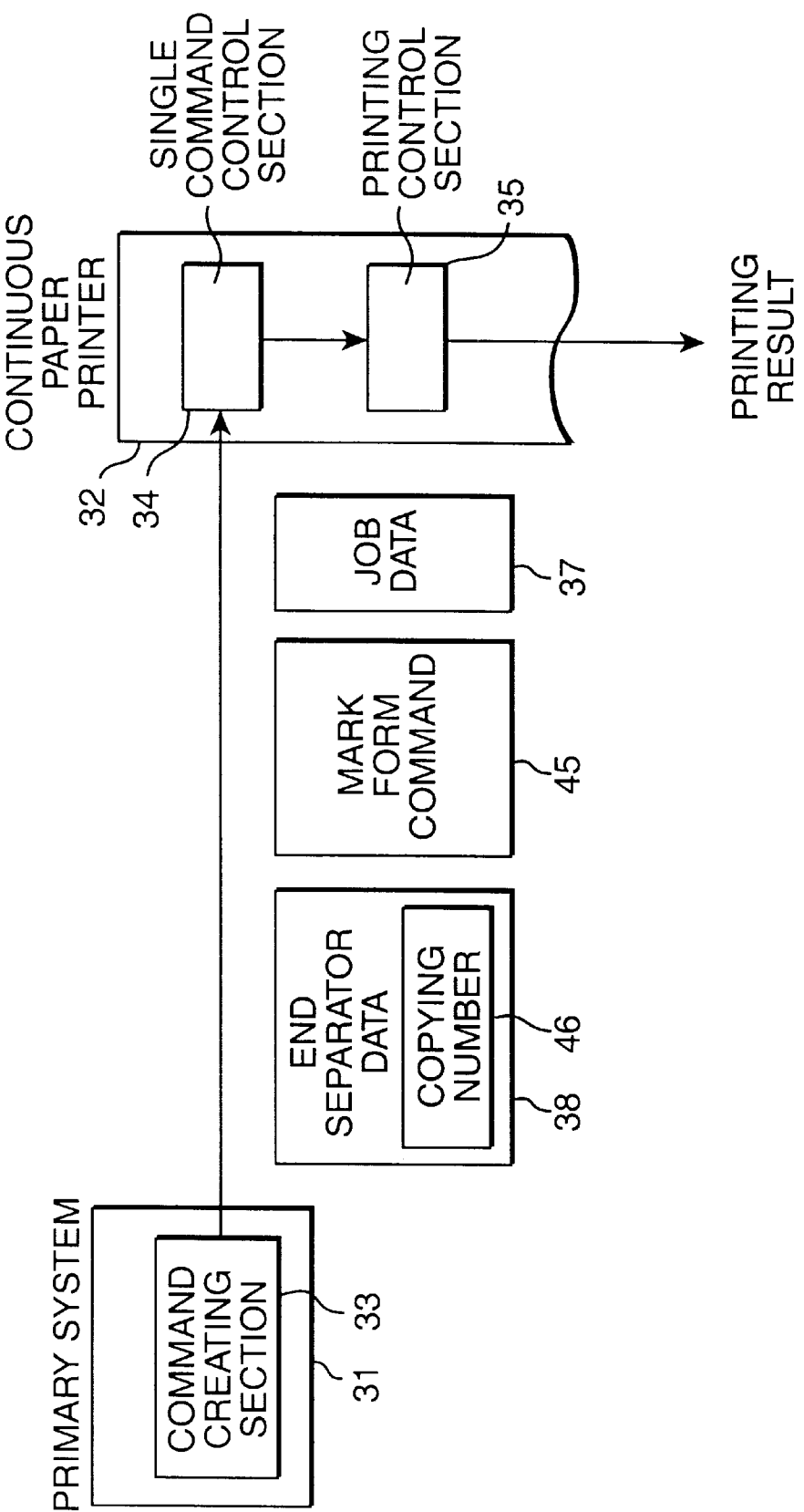
FIG. 4 is a block diagram showing another printing system for realizing the sorting control method according to the present invention using a continuous paper printer.

FIG. 4 is a block diagram illustrating another printing system for realizing the sorting control method according to the present invention by example of a continuous paper printer. A primary system 31 has a command creating section 33 for creating printing data and a mark form command 45 and transmitting them to a continuous paper printer 32.

The primary system 31 transmits job data 37 as a command, and also transmits the mark form command 45 after termination of a job. Then, the primary system 31 transmits end separator data 38 as a command. In the end separator data 38, a copying number 46 for designating the number of copying pages is designated as "n". The continuous paper printer 32 receives the commands and analyzes them at a command control section 34.

The subsequent printing step in this embodiment can be performed in the same manner as shown in FIG. 3.

Although the above embodiments are described by example of the continuous paper printer, the present invention can be applied to sorting control in a page printer or a sorter in which sorting is performed on the basis of the number of slide sheets in a stacker slide, the width of a stacker slide and the number of insertion of colored sheets.

Figure 5:
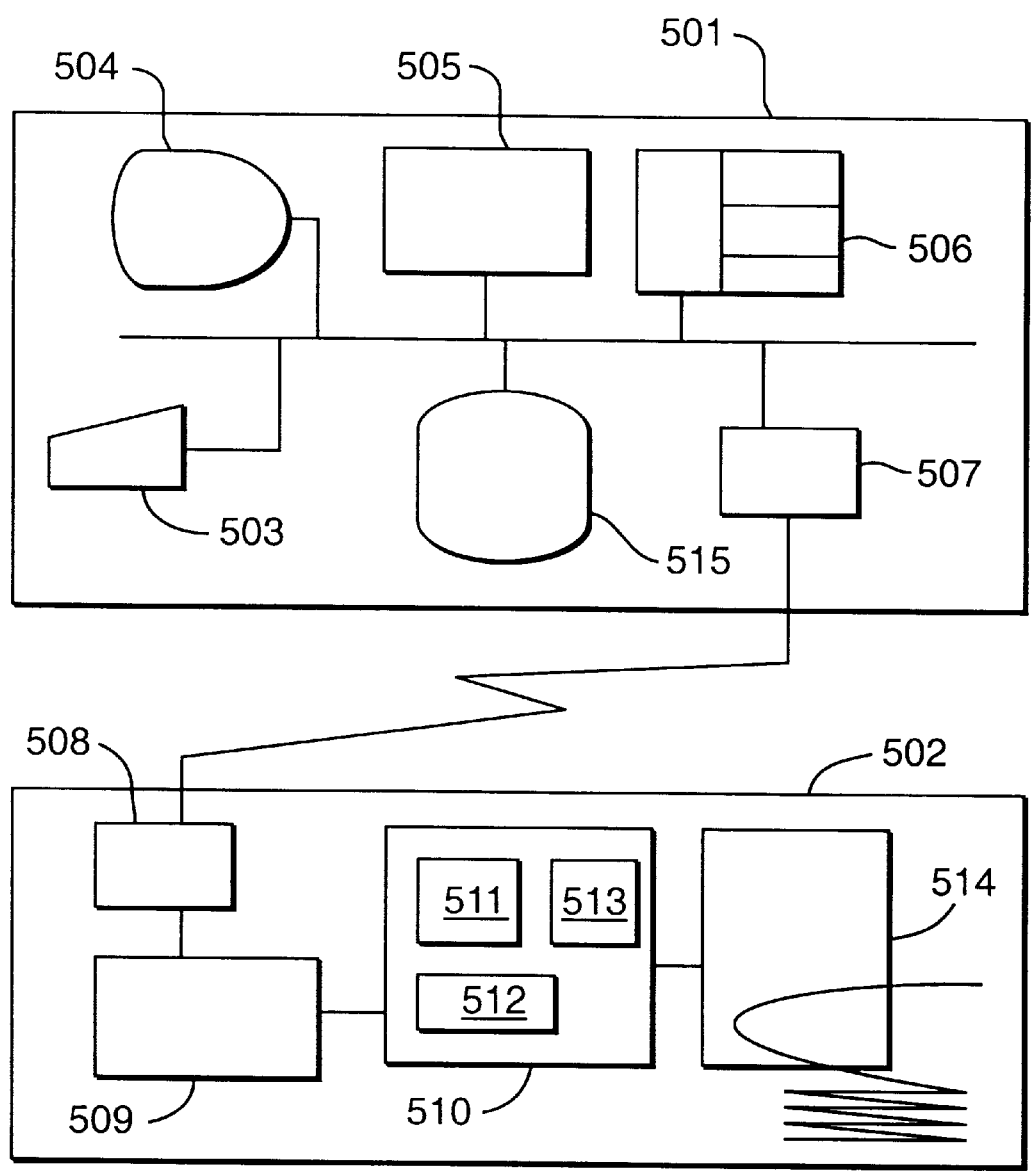
FIG. 5 is block diagram illustrating details of the printing system for realizing the sorting control method according to the present invention.

FIG. 5 is a block diagram more fully illustrating the printing system for realizing the sorting control method according to the present invention.

In FIG. 5, reference numeral 501 indicates a primary processing system such as a computer system. Into the primary system 501 are inputted data for preparation of job data and an operator's printing instruction. The primary system 501 includes an input device 503 such as a key board for inputting an instruction of the printing number of sorting pages, a display device 504, a processor 505 for executing various processes according to the instruction supplied from the input device, a ROM for storing a control program and the like, a RAM used for work, a memory 506 for containing a rewritable EPROM and the like, and a communication control section 507 for communication with a printer 502. In addition, an external storing device 15 is also provided.

The number of sorting pages designated by a mark form command (sorting operation designating information) created when sorting is instructed is stored in the rewritable EPROM in the memory 506.

The printer 502 includes a communication control section 508 for communication with the primary system 501, an input buffer 509 for temporarily storing data or commands transmitted from the primary system 501, a printer engine 514 for printing job data on cut sheets or continuous paper and executing printing for a sorting operation, and a controller 510 for controlling the printer engine.

The controller 510 includes an analyzing section 511 for extracting sorting instructing information and sorting operation designating information from printing data and analyzing their contents, a drawing section 512 for executing drawing for job data, and an instructing section 513 for communicating the results of the above-described analysis and drawing to the printer engine 514.

The primary system and the printer are interconnected to each other through, for example, a SCSI II interface.

Figure 6:
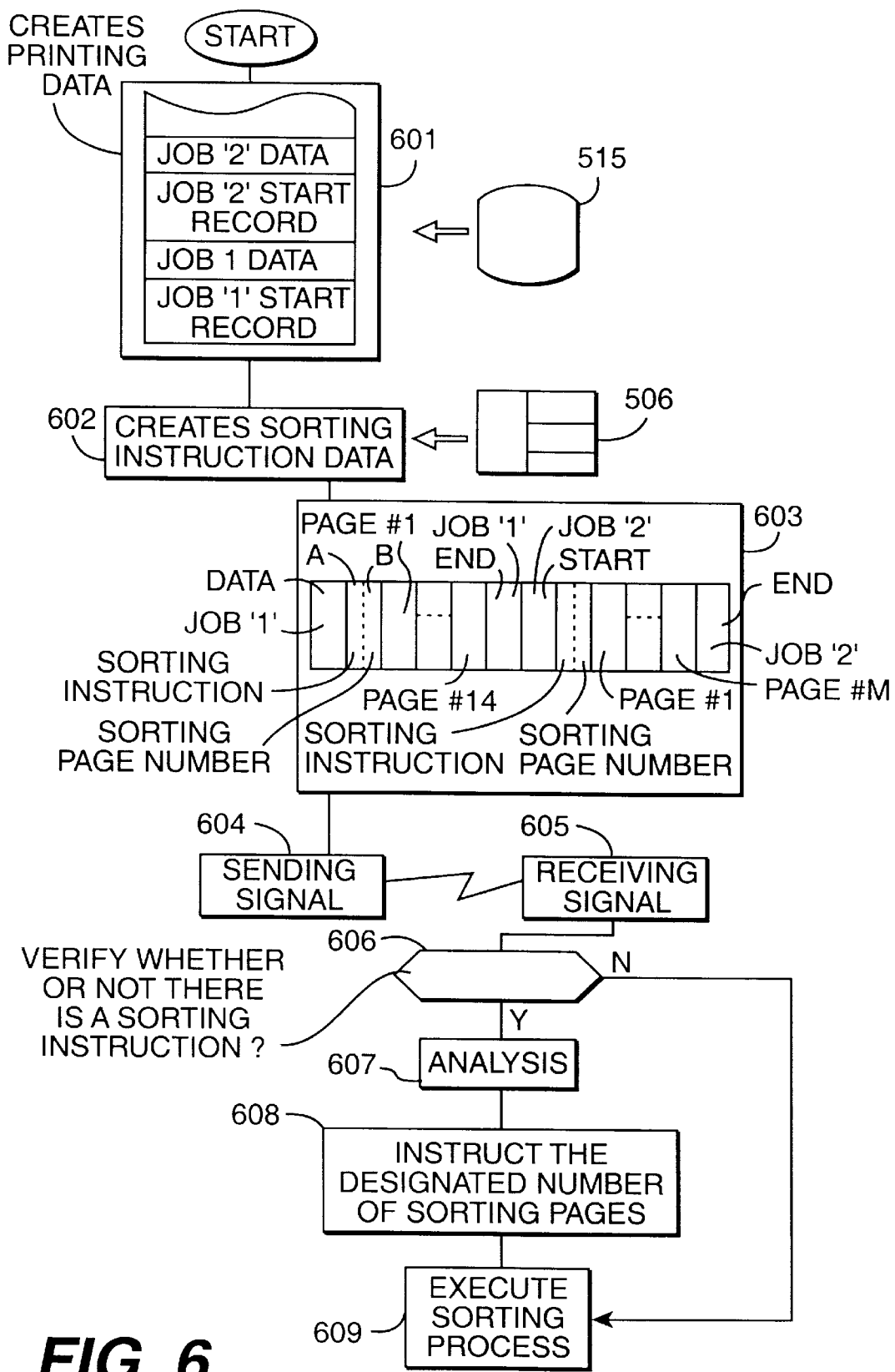
FIG. 6 is a flow chart showing a printing operation.

A flow chart of printing is shown in FIG. 6.

When a printing instruction is inputted from the input device 503, the processing device 505 reads out the relevant job data from the memory 506 or the external storing device 515 and creates printing data to be transmitted to the printer 502 (Step 601).

As shown in a block of Step 601, printing data to be transmitted is composed of a job starting code and job data to be printed.

After the printing data is created, end separator data (sorting instructing information) are added to the printing data ("a" in a block of Step 603); the number of sorting pages is read out from the memory 506; information indicating the read-out number of pages "n" is added to a mark form command (sorting operation designating information) ("b" in a block of Step 603); and the read-out number of pages "n" is added to the printing data as done with end separator information (Steps 602 and 603).

Then, the printing data thus prepared are transmitted to the printer 502 through the communication control section 507 (Step 604).

The printing data received through the communication control section 508 is temporarily stored in the input buffer (Step 605).

The controller 510 reads out the printing data stored in the input buffer and verifies whether they contain a sorting mark form command (b) in the printing date (Step 606).

In the case where no mark form command (b) is contained in the printing data, the number of sorting pages preset in the printer 50 is printed after termination of job data (Step 609).

In the case where a mark form command is contained in the printing data, the command is analyzed (Step 607) to extract the printing number of sorting pages, and the printer engine 514 is controlled to print the designated number of sorting pages after termination of printing of job data (Steps 608 and 609).

In this embodiment, the number of sorting pages stored in the rewritable EPROM in the memory 506 can be altered from the input device 503 of the primary system 501 by the operator.

The processing device 505, when receiving a command for altering the number of sorting pages from the input device, alters the number of sorting pages in a manner described below.

First, the processing device 505 reads out the number of sorting pages from the EPROM in the memory 506 and displays it on the display device 504.

When a command for altering the value is given from the input device, the processing system 505 writes the altered number of sorting pages in the EPROM in the memory 506.

If there is no alteration command, the value is stored as it is.

Since the number of sorting pages stored in the memory 506 can be altered, the user of the printing system can easily set the number of sorting pages at the time of actual printing.

Another processing example using the processing device 505 upon printing will be described below.

The processing device 505, when receiving a printing command from the input device 503, creates printing data in the same manner as shown in the processing flow chart in FIG. 5.

Then, the processing system 505 displays a screen asking the operator the desired number of sorting pages on the display device 504, and awaits for the operator to input the number of sorting pages.

When the number of sorting pages is inputted from the input device 503, the inputted value added to printing data as the number of sorting pages, i.e. "sorting operation designating information" is outputted to the printer 502.

To be more specific, with the desired number of sorting pages asked to the operator upon reception of a printing, a command for executing a sorting operation is supplied to the printer 502 in response to the operator's response.

According to the present invention as described above, it is possible to dynamically alter, based on a command supplied from the primary system, the number of the printing pages of separation marks indicating a separation between jobs, and hence to reduce the number of separation marks to three pages to save paper, or to increase the number of separation marks to seven pages in the case where it is hard to recognize a separation between jobs. Thus, it is possible to provide a printing system capable of allowing its user to set a sorting condition as desired, and hence to improve the usability thereof.

INDUSTRIAL APPLICABILITY

As described above, in the printing system composed of a primary system and a printer according to the present invention, it is possible to enhance flexibility in sorting operation, that is, to easily sort printed matters, and hence to improve the usability of an information processing system requiring printing.

What is claimed is:

1. A printing system comprising a primary system for outputting a command for printing job data to be printed, and a printer for printing the job data on the basis of the command supplied from said primary system, comprising:

said primary system including a sorting instructing means for outputting a sorting command for designating contents of a sorting operation, the sorting operation being a printing operation for indicating a separation between the job data, said printer including means for analyzing said sorting command; and means for executing the sorting operation in accordance with the result of the analysis by said analyzing means after said printing of job data.

2. A printing system according to claim 1, wherein the number of sorting pages is designated as the contents of said sorting operation.

3. A printing system according to claim 1, wherein said primary system comprises an input device for inputting an instruction for printing the job data to said sorting instructing means, and said sorting instructing means transmits said sorting instructing command to said printer in accordance with the printing instruction supplied from said input device.

4. A printing system according to claim 2, wherein said primary system comprises an input device for inputting an instruction for printing the job data to said sorting instructing means, and said sorting instructing means transmits said sorting instructing command to said printer in accordance with the printing instruction supplied from said input device.

5. A printing system according to claim 4, wherein said primary system comprises a memory for storing the number of sorting pages; and said sorting instructing means refers to said memory in response to said printing instruction, reads out said number of sorting pages, and adds information instructing said number of sorting pages to said sorting instructing command.

6. A printing system according to claim 4, wherein said primary system comprises a display means for displaying asking the operator the desired number of sorting pages; and said processing device displays a screen asking the operator the desired number of sorting pages on said display means in response to said printing instruction and adds numerical data inputted later from said input device to said sorting instructing command as the number of sorting pages.

7. A printing system according to claim 2, wherein said sorting instructing command includes information giving the timing of starting said sorting operation.

8. A printer comprising:

a means for receiving printing data including job data to be printed and a sorting instructing command for designating a sorting operation;

storing means for temporarily storing the received printing data;

means for reading out printing data from said storing means, extracting a command regarding a sorting operation from the printing data and analyzing the command; and means for executing a sorting operation in accordance with the analyzed result obtained by said analyzing means after printing of said job data.

9. A printer according to claim 8, wherein said sorting instructing command includes information indicating the number of sorting pages, and said analyzing means extracts the number of sorting pages from said sorting instructing command and instructs said sorting executing means to execute a sorting operation.

10. A printer according to claim 9, wherein when the number of sorting pages is not included in said sorting instructing command as the result of analyzing said sorting instructing command by said analyzing means, only preset sorting pages are printed.

11. A printing control method using a printing system composed of a primary system for outputting an instruction for printing job data to be printed and a printer for printing the job data upon reception of the printing instruction, characterized in that said primary system outputs a sorting instructing command for designating contents of a sorting operation which is a printing operation for indicating a separation between said job data;

said printer receives and analyzes said sorting instructing command; and said printer executes a sorting operation in accordance with the analyzed result after printing of said job data.

12. A printing control method according to claim 11, wherein said primary system includes at least the number of sorting pages in said sorting instructing command;

said printer analyzes said sorting instructing command and extracts the number of sorting pages to be printed; and said printer prints only the sorting pages in accordance with the extracted result.

13. A printing control method according to claim 11, wherein said primary system has an input device for inputting an instruction for printing said job data; and said input device transmits said sorting instructing command to said printer in response to the input of the instruction for printing said job data.

14. A printing control method according to claim 11, wherein said primary system has a display means for displaying a screen asking the operator the desired number of sorting pages; and said primary system displays a screen asking the operator the number of sorting pages on said display means in response to the input of said printing instruction, and adds numerical data inputted from said input device to said sorting instructing command as the number of sorting pages.

* * * * *